United States Patent Office.

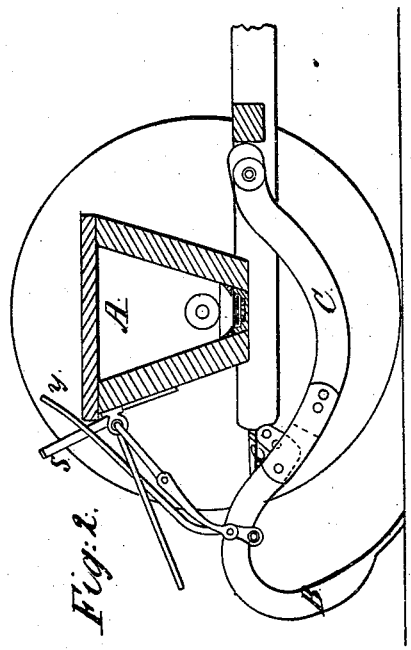
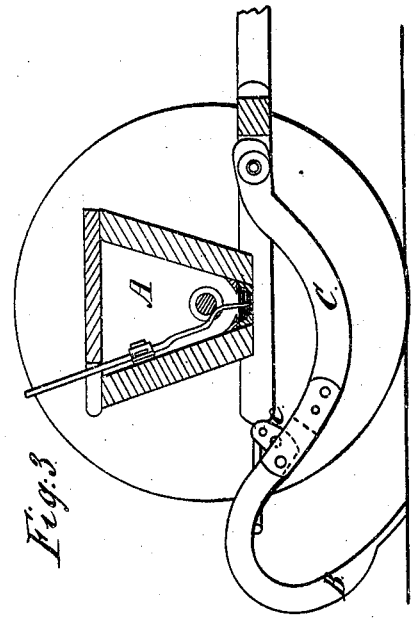
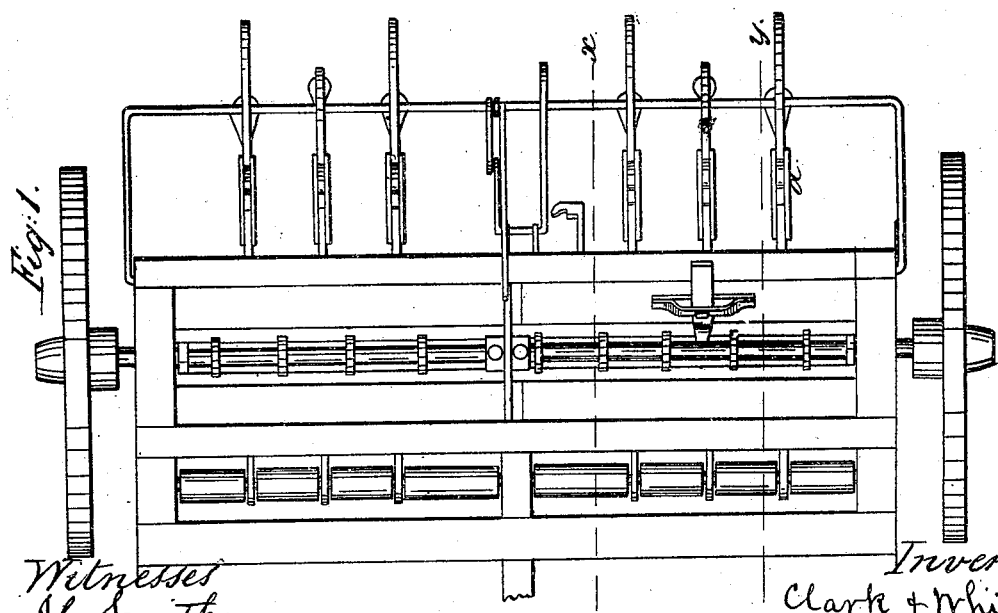

SANFORD S. CLARK AND JOHN G. WHITNEY, OF INDEPENDENCE, IOWA.

Letters Patent No. 85,907, dated January 19, 1869

IMPROVEMENT IN SEED-SOWER.

The Schedule referred to in these Letters Patent and making part of the same.

*To all whom it may concern:*

Be it known that we, SANFORD S. CLARK and JOHN G. WHITNEY, of Independence, in the county of Buchanan, and State of Iowa, have invented a new and valuable Improvement in Seed-Sowers; and we do hereby declare that the following is a full, clear, and exact description of the construction and operation of the same, reference being had to the annexed drawings, making a part of this specification, and to the letters and figures of reference marked thereon.

Figure 1, of the drawings, is a representation of a plan view of our seed-sower, and Figures 2 and 3 are sectional views thereof.

Our invention relates to that class of agricultural implements intended for sowing grain, and covering the same by means of cultivator-plows, and is designed as an improvement upon the device usually known as "Ingall's Improved Iowa Seeder and Cultivator," patented February, 1868.

Our improvement consists in attaching the seed-box to the axle-tree, in providing double lifters for the plows, one of which may be worked from the top of the seed-box, and the other from the rear of the plows; also, in connecting the plows to the handles thereof, by means of toggle-joints, the toggles being wooden pins that will break off, when the plows meet serious obstructions, and thereby save the plows from being bent or broken.

The letter A, of the drawings, represents the seed-box adjusted to the axle-tree of the carriage.

The letters B are the plows, and

The letters C, the arms thereof.

These arms have slots in their rear ends, in which the front ends of the plows are pivoted, as shown at *a*.

Forward of the point at which these plows are pivoted, they are respectively turned upward, as shown, and an apperture is made in said upright part, as represented by the letter *c*.

This aperture is intended to receive and hold a wooden pin, which, when placed therein, rests on both sides of the slot in the arms C.

Our lifting-devices are shown on fig. 2 of the drawings, of which the letter *s* is a lever that may be operated from the top of the seed-box, and letter *y* is a lever that may be operated by the driver while walking behind the plows. By pulling the lever *y* downward, to the rear, or the lever *s* upward, toward the front, the plows will be lifted from the ground.

What we claim as our invention, and desire to secure by Letters Patent, is—

The double-lever lifting-apparatus herein shown and described, substantially as and for the purposes specified.

In testimony that we claim the above, we have hereunto subscribed our names, in the presence of two witnesses.

SANFORD S. CLARK.
JOHN G. WHITNEY.

Witnesses:
D. H. GILL,
J. B. DONNAN,